Figure 1:
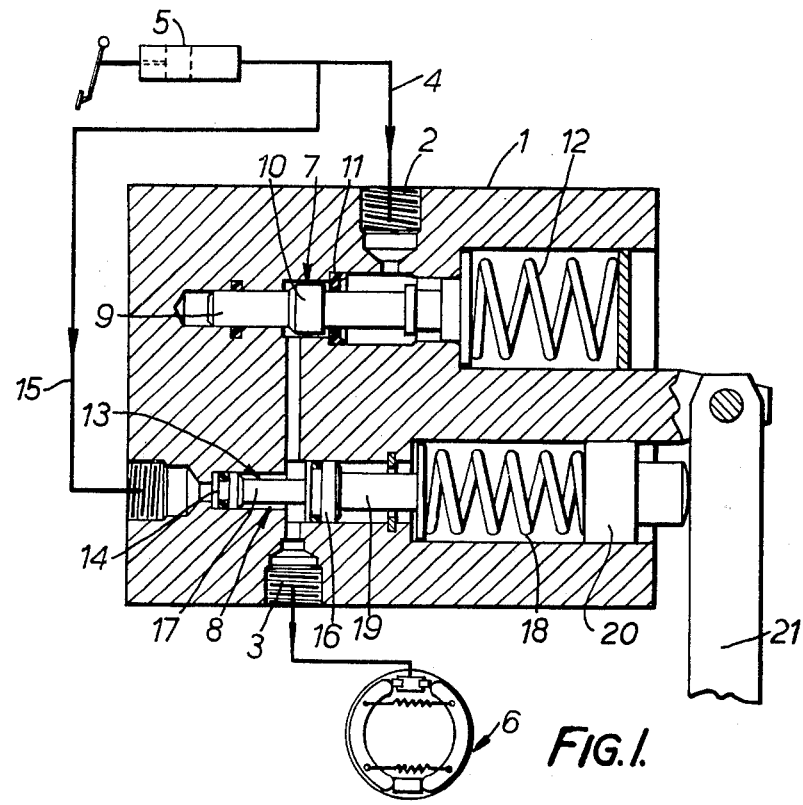

United States Patent [19]
Unterberg

[11] 3,989,312
[45] Nov. 2, 1976

[54] CONTROL VALVE ASSEMBLIES FOR USE IN FLUID PRESSURE BRAKING SYSTEMS

[75] Inventor: Hartmut Unterberg, Koblenz-Metternich, Germany

[73] Assignee: Girling Limited, Birmingham, England

[22] Filed: June 13, 1975

[21] Appl. No.: 586,603

[30] Foreign Application Priority Data
June 27, 1974 United Kingdom............... 28674/74

[52] U.S. Cl................................. 303/6 C; 188/195; 188/349; 303/22 R; 303/84 R
[51] Int. Cl.²........................ B60T 8/18; B60T 8/26
[58] Field of Search................ 303/6 C, 6 R, 22, 84; 188/152, 195, 349

[56] References Cited
UNITED STATES PATENTS

| 3,163,473 | 12/1964 | Stelzer | 303/6 C |
| 3,304,128 | 2/1967 | Farr | 303/6 C |
| 3,314,235 | 4/1967 | Stelzer | 303/6 C X |
| 3,545,814 | 12/1970 | Margetts | 303/6 C |
| 3,731,981 | 5/1973 | Bueler | 303/22 R |
| 3,848,932 | 11/1974 | Lewis | 188/195 X |

FOREIGN PATENTS OR APPLICATIONS

| 1,285,197 | 1/1962 | France | 303/22 R |

*Primary Examiner*—Stephen G. Kunin
*Assistant Examiner*—Douglas C. Butler
*Attorney, Agent, or Firm*—Scrivener, Parker, Scrivener and Clarke

[57] ABSTRACT

A fluid pressure operated vehicle braking system includes a control valve assembly comprising an inlet and outlet, a normally-open valve having a valve member movable in response to a predetermined inlet pressure to control the flow of pressure fluid between the inlet and the outlet, and a stepped piston subjected to a biasing force dependent upon the vehicle loading and operable in response to both the inlet pressure and the biasing force to reduce the outlet pressure after the predetermined inlet pressure is attained.

11 Claims, 4 Drawing Figures

CONTROL VALVE ASSEMBLIES FOR USE IN FLUID PRESSURE BRAKING SYSTEMS

This invention relates to control valve assemblies for use in vehicle braking systems.

Such control valves are normally inserted in the pressure line to one set of brakes, usually the rear wheel brakes, to limit or reduce the pressure applied to the rear wheel brakes in relation to the full braking pressure applied to the front wheel brakes.

Previously proposed control valve assemblies include a normally-open control valve having a valve member which is movable against a pre-load to close the valve. The pre-load is often dependent upon the vehicle loading, in which case the valve is mounted on either the sprung or unsprung part of the vehicle and a linkage connects the valve member to the other vehicle part so that relative movement between the parts, for example due to vehicle loading or unloading, is sensed by the linkage to vary the pre-load on the valve member and alter the characteristics of the valve, i.e. the variation of outlet pressure as compared to inlet pressures. Thus, the rear wheel braking effort varies with respect to front wheel braking effort in dependence upon vehicle loading.

Some motor vehicles, particularly commercial vehicles, have in their unladen condition most of their weight at the front and the required braking effort distributions between the rear and front wheel brakes in the laden and the unladen condition are considerably different. It is desirable for the braking effort on the rear wheel brake in the unladen condition to be less than in the laden condition to reduce the deceleration of the vehicle, which contributes to better stability of the vehicle during braking.

The previously proposed control valve assemblies do not provide a sufficiently different braking effort distribution for such commercial vehicles and the object of the present invention is to provide a control valve assembly which is particularly suitable for use with such vehicles having the major part of their weight at the front of the vehicle.

In accordance with the present invention, there is provided a control valve assembly for use in a vehicle fluid pressure operated braking system, comprising an inlet and outlet, a normally-open valve having a valve member movable in response to a predetermined inlet pressure to control the flow of pressure fluid between the inlet and the outlet, and a pressure responsive means subjected to a biasing force dependent upon the vehicle loading and operable in response to both the inlet pressure and said biasing force to reduce the outlet pressure after the predetermined inlet pressure is attained.

In a preferred embodiment of the invention described in detail below, the pressure responsive means comprises a stepped piston having a smaller diameter end subject to the inlet pressure and a larger diameter end subject to ambient atmospheric pressure and to the biasing force which oppose the inlet pressure force on the piston.

Figure 2:
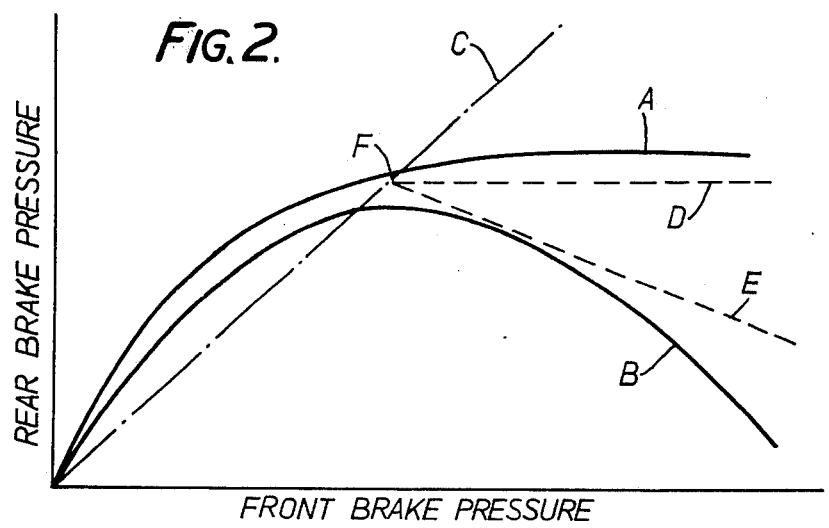
Figure 3:
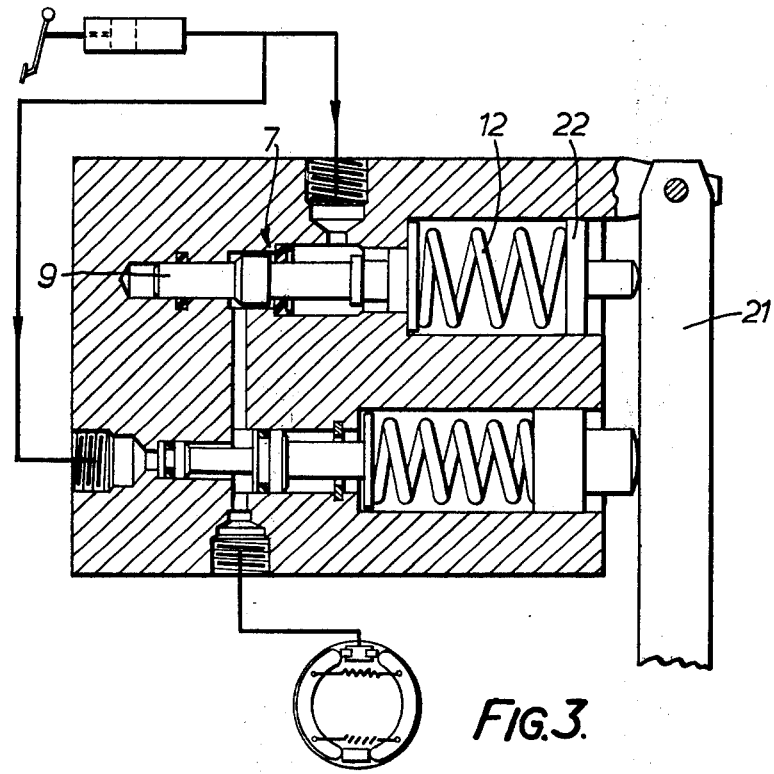
Figure 4:
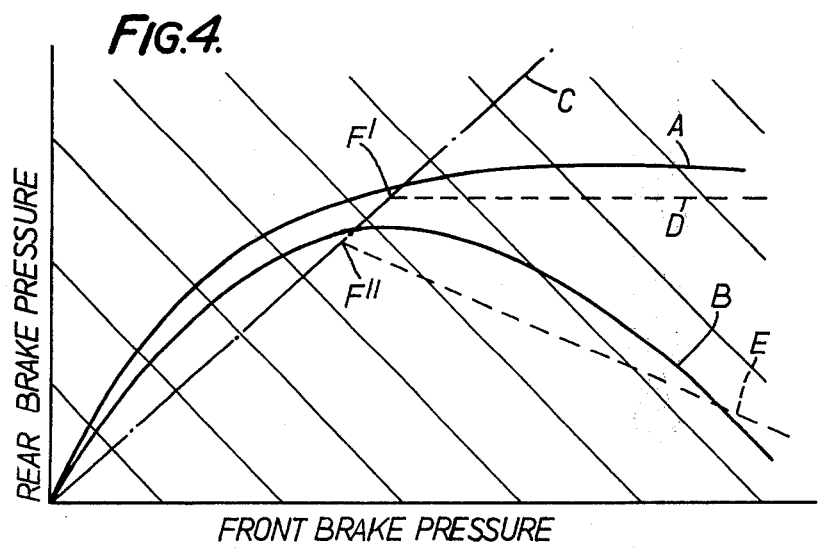

Two forms of control valve assembly in accordance with the invention in a vehicle braking system will now be described with reference to the accompanying drawings, in which:

FIG. 1 is an axial cross-section of one form of valve assembly connected in part of the braking system which is shown schematically, FIG. 2 shows graphs of rear wheel braking effort against front wheel braking effort including ideal curves and the curves obtained using the valve assembly of FIG. 1, FIG. 3 is a view similar to FIG. 1 of the other form of valve assembly, and FIG. 4 is similar to FIG. 2 but showing the curves obtained using the valve assembly of FIG. 3.

Referring to FIG. 1, the control valve assembly comprises a housing 1 having an inlet 2 and an outlet 3 for connection in a pressure line 4 from a master cylinder 5 to the rear wheel brake 6; a control valve 7; and a piston assembly 8.

The control valve 7 comprises a valve stem 9 having a valve head 10 which co-operates with an annular valve seat 11 and which is subjected to a pre-load which normally holds the valve in the illustrated open condition. The pre-load is provided by a coil compression spring 12. In operation, the pressure at the inlet 2 acts on a differential area of valve stem 9 and when the force on the piston overcomes the pre-load the stem moves to the right to close the valve. The illustrated valve 7 is a pressure limiting valve which remains closed until the inlet pressure is released so that the pressure on the outlet side of the valve is limited to a predetermined value. The control valve may, however, be a pressure reducing valve which, as the inlet pressure increases, opens and closes to meter pressure fluid so that the pressure at the outlet side of the valve increases at a reduced rate as compared with the inlet pressure.

The piston assembly 8 comprises a stepped piston 13 having opposed piston heads of different cross-sectional area, the smaller head 14 being subjected to the full inlet pressure from the master cylinder transmitted through pressure line 15 and the larger head 16 being subjected to a variable biasing force which opposes the inlet pressure force acting on head 14. The inwardly opposed faces of the piston heads 14, 16 are interconnected by a piston rod 17 of smaller diameter than the heads and subjected to the outlet pressure of valve 7, with the opposite side of the larger diameter end portion being subjected to ambient atmospheric pressure which moves past the unsealed periphery of a movable spring abutment member 22. The biasing force is applied by a coil compression spring 18 through a seat member 19. The biasing force of the spring 18 is varied by movement of a lever 21 which is pivotally mounted on the housing 1 and which is pivotable in dependence upon vehicle loading, for example by mounting the housing 1 on a sprung part of the vehicle and connecting the lever 21 through a linkage to the unsprung part of the vehicle, in known manner. The spring 18 ensures that the piston 13 does not move until the valve 7 has closed.

Operation of the valve assembly will now be described with particular reference to the graph of FIG. 2 which shows various curves of front brake pressure against rear brake pressure. A and B (shown in full lines) are respectively the ideal curves of the vehicle in the loaded and unloaded conditions, C is the curve obtained if the rear brake is not limited or reduced with respect to the front brake pressure, and D and E are respectively the curves obtained in the loaded and unloaded conditions of the vehicle using the above-described control valve assembly.

In the loaded vehicle condition, the lever 21 compresses the spring 18 to give a relatively high pre-load. Increase in inlet pressure closes the valve 7 (at point F on curve D) and the outlet pressure thereafter remains constant, until the brakes are released. The biasing force on piston 13 is such that the sum of the inlet pressure force on smaller head 14 and the outlet pressure force on the differential area of the heads and piston 17 is insufficient to overcome the biasing force.

In the unloaded condition, the biasing force on piston 13 is reduced and, after the valve 7 has closed, further increase in inlet pressure acts on the smaller head 14 of the piston 13 and is sufficient to gradually move the piston against the biasing force. Such movement increases the volume on the outlet side of valve 7 and thus reduces the outlet pressure as the inlet pressure increases, as shown in curve E. The deceleration of the vehicle is thereby reduced and the tendency of the vehicle to pitch is thus reduced.

It will be seen from FIG. 2 that when using the above described control valve assembly the curves follow closely the ideal curves.

The control valve assembly of FIG. 3 is generally similar to that of FIG. 1 and the same reference numerals are used to denote corresponding parts. The only diifference is that in the assembly of FIG. 2 the control valve 7 is dependent upon the vehicle loading. The lever 21 is pivotally mounted so that it acts on a spring seat member 22 to vary the pre-load on the valve stem 9 in dependence upon the vehicle loading. Thus, the cut-in point at which the valve 7 closes is different under different vehicle loading conditions so that, as seen in FIG. 4, the valve 7 closes at point F' in the loaded condition and at point F'' in the unloaded condition.

As with the previously described control valve assembly, the valve 7 may be a pressure reducing valve rather than a limiting valve.

What I claim is:

1. A pressure control valve assembly for use in a fluid pressure operated vehicle braking system, comprising a housing having an inlet and outlet; a normally-open valve having a valve member movable in response to a predetermined inlet pressure to control the flow of pressure fluid between the inlet and the outlet; a pressure responsive means; and a biasing means subjecting said pressure responsive means to a biasing force in dependence upon loading of said vehicle; said pressure responsive means being operable in response to both the inlet pressure and said biasing force to reduce the outlet pressure relative to the outlet pressure existing when the valve closes, after the predetermined inlet pressure is attained.

2. A control valve assembly according to claim 1, wherein said pressure responsive means comprises a stepped piston operable to vary the volume of said outlet to reduce the outlet pressure.

3. A control valve assembly according to claim 2, wherein said stepped piston has a smaller diameter end portion subject to inlet pressure, and a larger diameter end portion subjected to ambient atmospheric pressure, said biasing force acting on said piston to oppose the inlet pressure.

4. A control valve assembly according to claim 3, wherein said piston has a reduced diameter portion between said ends and subjected to said outlet pressure.

5. A control valve assembly according to claim 1, wherein said valve member and said pressure responsive means are generally parallel.

6. A control valve assembly according to claim 1, wherein said biasing means comprises a lever pivoted to said valve housing and acting on said pressure responsive means.

7. A control valve assembly according to claim 6, wherein said lever applies a biasing force to said valve member.

8. A control valve assembly according to claim 6, wherein said biasing means includes resilient biasing means, said lever acting through the intermediary of said resilient biasing means.

9. A control valve assembly according to claim 1, wherein said valve is a pressure limited valve.

10. The control valve assembly according to claim 1 wherein the pressure responsive means is at all times subjected to inlet pressure.

11. A pressure control valve assembly for use in a fluid pressure operated vehicle braking system comprising a housing having an inlet and outlet; a normally-open inlet valve having a valve member closable in response to a predetermined inlet pressure to control the flow of pressure fluid between the inlet and the outlet; a pressure responsive means subjected at all times to the pressure at said housing inlet; biasing means subjecting said pressure responsive means to a biasing force in dependence upon loading of said vehicle; pressure reducing means arranged to control the pressure at said outlet and operatively connected to said pressure responsive means and said biasing means to reduce the outlet pressure following closing of said inlet valve and subsequent increase of inlet pressure relative to the outlet pressure existing when the inlet valve closes and acting on said pressure responsive means.

* * * * *